United States Patent [19]

O'Hanlon

[11] Patent Number: 5,597,036
[45] Date of Patent: Jan. 28, 1997

[54] BALANCED DRIVE WITH RADIALLY SLOTTED COUNTERCRANK FOR ORBITAL TUBE WHIP ROD HEAT EXCHANGER

[75] Inventor: Joseph B. O'Hanlon, Springfield, Mo.

[73] Assignee: Paul Mueller Company, Springfield, Mo.

[21] Appl. No.: 621,812

[22] Filed: Mar. 22, 1996

Related U.S. Application Data

[63] Continuation-in-part of Ser. No. 262,239, Jun. 20, 1994, Pat. No. 5,513,698.
[51] Int. Cl.$^6$ ..................................................... F28F 13/02
[52] U.S. Cl. ..................................... 165/94; 165/DIG. 320; 62/354
[58] Field of Search .......................... 165/94, DIG. 320; 62/354; 202/175; 74/594.1, 595

[56] References Cited

U.S. PATENT DOCUMENTS

| | | | |
|---|---|---|---|
| 371,487 | 10/1887 | Butler | 74/595 X |
| 1,783,844 | 12/1930 | Jacobsen | 165/94 X |
| 4,147,750 | 4/1979 | Geria et al. | |
| 4,230,529 | 10/1980 | Li | |
| 4,441,963 | 4/1984 | Li | |
| 4,618,399 | 10/1986 | Li | |
| 4,762,592 | 8/1988 | Li | |
| 4,781,245 | 11/1988 | Freychet et al. | 165/94 |
| 5,221,439 | 6/1993 | Li et al. | |
| 5,363,660 | 11/1994 | Li et al. | 62/71 |
| 5,385,645 | 1/1995 | Li | 202/175 |
| 5,513,698 | 5/1996 | O'Hanlon | 165/94 |

FOREIGN PATENT DOCUMENTS

| | | | |
|---|---|---|---|
| 616368 | 2/1927 | France | 165/94 |
| 2061878 | 6/1972 | Germany | 74/595 |
| 2189305A | 10/1987 | United Kingdom | 165/94 |

*Primary Examiner*—Allen J. Flanigan
*Attorney, Agent, or Firm*—Howell & Haferkamp, L.C.

[57] ABSTRACT

An orbital rod drive arrangement for an orbital tube whip rod heat exchanger includes a single drive plate driving a plurality of countercranks, each countercrank supporting a whip rod from its upper end within a tube and from a radially extending slot therein as it is driven in an orbital manner. The countercrank provides for balancing the whip rods within the tubes by mounting them in an offset manner. Furthermore, the whip rod is suspended as well as driven at its upper end to thereby leave the lower ends of the tubes unobstructed for the free flow of process fluid out the bottom of the tube. The countercrank includes an upper peripheral lip for supporting a single drive plate and the countercrank may be supported by the tube sheet which mounts the uniformly spaced tubes in the heat exchanger vessel. The radially extending slot accommodates migration of the whip rod in a radial direction in response to any buildup of material along the sidewall of its associated tube. In the extreme, the whip rod may migrate to the center of the countercrank and be "frozen" fixedly within the tube and yet the countercrank be free to rotate. This permits individual tubes to be frozen and other tubes to remain fully operational with no mechanical binding or damage to the drive plate, countercrank, or whip rod.

36 Claims, 6 Drawing Sheets

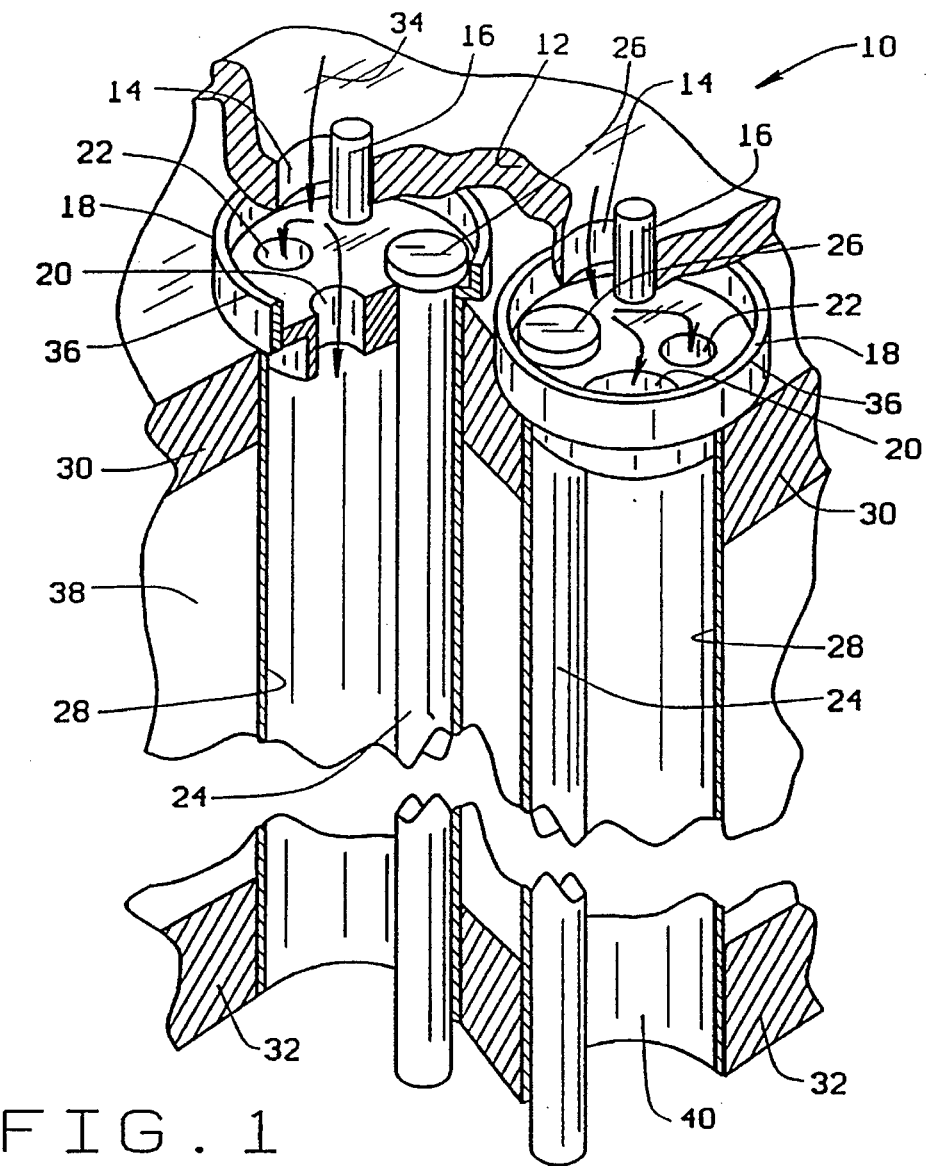
FIG. 1
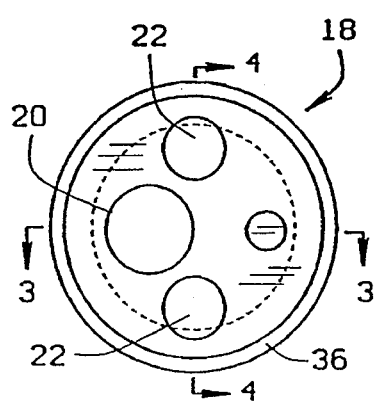
FIG. 2
FIG. 3
FIG. 4
FIG. 5

BALANCED DRIVE WITH RADIALLY SLOTTED COUNTERCRANK FOR ORBITAL TUBE WHIP ROD HEAT EXCHANGER

CROSS REFERENCE TO RELATED APPLICATION

This application is a continuation-in-part of U.S. Ser. No. 08/262,239 filed Jun. 20, 1994, now U.S. Pat. No. 5,513,698.

BACKGROUND AND SUMMARY OF THE INVENTION

Orbital tube whip rod heat exchangers, including both evaporators and freezers, have been recently developed and are the subject of several recently issued patents. An example of an orbital tube whip rod heat exchanger used as an evaporator may be found in U.S. Pat. No. 5,221,439 issued Jun. 22, 1993. The orbital tube whip rod construction has been carried forward by the same inventor in constructing a freezer and, for our purposes, more particularly with respect to a drive arrangement for the orbital tube whip rods as shown in U.S. Pat. No. 5,385,645 issued Jan. 31, 1995, and entitled Heat Transfer Apparatus With Positive Drive Orbital Whip Rod, the disclosure of which is incorporated herein by reference. As shown therein, a plurality of tubes are supported by a pair of tube sheets at their upper and lower ends within a vessel. Each tube has a rod extending throughout its length which is driven orbitally about its inner circumference by an upper and lower drive plate. The material to be processed is fed through the interior of the tube and is spread in a thin film over the inner circumference of the tubes by the rods. A refrigerant is circulated within the vessel between the tube plates so as to chill the exterior of the tubes and thereby freeze the processed fluid. An ice crystalline slurry exits the bottom of the tubes and is pumped away to a storage tank or otherwise utilized depending upon the particular application.

Various arrangements are suggested for the mounting and support of the whip rods and various alternatives are suggested for the drive plates. One of the drive plate arrangements addresses the inherent vibration problem which is experienced as induced by the dynamic forces generated by the rods as they are orbitally driven within the freezer. As shown in FIG. 3 of this patent, a pair of orthogonal drive plates supported by eccentric bearings and mounting brackets are oriented 180° apart and each drives half the rods, or whip rods, thereby balancing the mass of the rods. However, this construction requires a pair of vertically spaced, offset drive plates at each of the upper and lower rod ends, the complexity of offset eccentric bearings, and lost space in the area of overlap between the drive plates where tubes may not be placed due to plate-rod interference. This plate-rod interference also dictates a specific and non-uniform placement of the tubes and rods which requires a vessel having a greater cross-sectional area to contain the same number of tubes and rods. Thus, more refrigerant is required to fill the necessarily larger vessel over a vessel containing tubes which are uniformly spaced. For these and other reasons, it is not anticipated that this arrangement will be commercialized.

Still another drawback to the revolutionary designs disclosed in the prior patents is the undesirable obstruction of the drive plate and other supporting structure at the lower ends of the rods and tubes. During the operation of the orbital rod freezer, as mentioned above, a slurry of ice is produced as the process fluid traverses the tubes from top to bottom. It has been found that obstructions at the lower ends of the tubes and rods provide convenient locations for the formation and accumulation of solid ice pack which interferes with and clogs the continuing flow of ice slurry. Although the patent suggests different arrangements for supporting the whip rods and mounting the drive plates, it is not believed to have been contemplated that an orbital rod freezer could be constructed which would be totally unobstructed at the lower tube and rod ends.

In order to solve these and other problems in the prior art, the inventor herein has previously succeeded in designing and developing an improvement to the very valuable and important inventions disclosed relating to the orbital tube whip rod heat exchanger and especially including the orbital rod freezer. The inventor's improvement is disclosed and claimed in the parent cross-referenced above and includes the development of a technique and structure for supporting and driving the whip rods solely at their upper ends while at the same time providing for a dynamic balancing of the forces generated by the rods as they are driven orbitally within the tubes. The inventor achieves these desirable features by utilizing a countercrank associated with each whip rod and tube, the countercrank having at least two whip rod holes, either one of which may receive a whip rod. The whip rod holes are located 180° from each other around the circumference of the countercrank. The rods may thus be installed in an offset manner from one tube to another and driven with a single drive plate in an elegantly simple, efficient arrangement. As the countercranks provide the only driving connection between the drive plate and rods, a single drive plate may be used to drive each countercrank drive pin to achieve a dynamic balancing of the dynamic forces which eliminates vibration in the heat exchanger. Although a countercrank having two or three holes is shown in the preferred embodiments of the invention, it should be understood that other variations may be implemented without departing from the general concept of equally distributing the mass of the rods about the center of the tube pattern, such that the center of mass of each opposed group of rods has a common rotational center, thereby balancing the forces induced, while preventing any unbalanced moments. One such variation would include providing a single whip rod hole, but locating the whip rod hole at different locations in different countercranks which would then become a matched set for the particular number of tubes used in a particular heat exchanger. Other variations also are feasible including varying the mass of the rod itself.

The rod is supported within the whip rod hole by a top hat or flange at its upper end which is larger in diameter than the whip rod hole. The whip rod is thus suspended within the tube by the countercrank. This permits the bottom of the tube and rod to be free from obstruction in that there are no drive plates or rod supports. As explained above, this arrangement is ideal at least in the orbital rod freezer as it eliminates any structure which could accumulate and help form ice pack from the ice slurry which streams out the bottom of the tubes.

Still another advantage of the use of the countercrank is that various arrangements can be made for actually supporting the drive plate itself on top of the countercrank and the countercrank may then in turn be supported from the tube sheet, tube, or combination thereof, or even a replaceable bearing plate to further simplify and streamline the construction of the orbital rod freezer. This simplification and streamlining is important in that the drive plate may be driven at an orbital speed which could induce significant wear to other more complex or inelegant arrangements.

Also, more complicated mechanical arrangements with bearings or the like add expense and potential for mechanical failure.

While the inventor's previous development of the countercrank solves many problems with the prior art, and provides many functional advantages which were not previously available, one problem which remained was the inability to provide for the potential for clogging of individual tubes in a multi-tube heat exchanger. For example, when the heat exchanger is used to create an ice slurry, it is possible that individual tubes may begin to accumulate ice along the inside wall of the tube. When this happens, binding between the whip rod and the countercrank occurs which can result in either the countercrank breaking (when constructed of plastic) or dislodging of the countercrank drive pin from its associated drive plate. With the present system controls, blockage of one or several tubes will not typically provide enough of a loss in performance to trigger system monitoring equipment so as to shut down the entire heat exchanger. For example, monitoring of operating temperatures and refrigerant line pressures would not sense the small loss in performance if only several tubes out of a multiple-tube bundle should freeze. Therefore, not only might some time pass before the failure would be detected, but the system would continue to run and potentially cause greater damage.

In order to eliminate any potential equipment damage or maladjustment, while also accommodating the possibility of individual tubes becoming frozen or clogged, the inventor herein has succeeded in designing and developing an improvement to his countercrank which includes a radially-oriented slot extending from the center of the countercrank to the periphery thereof for receiving a whip rod. As the countercrank rotates, centrifugal forces will move the whip rod toward, but not in contact with the outermost or peripheral end of the slot which is the normal operating position for the whip rod to circulate around the inner sidewall of the tube. In the event that a layer of ice or other obstruction forms along the inner surface of the tube wall, the whip rod may automatically self-adjust by migrating radially inward. In this manner, the whip rod may continue its job, to the extent possible, by wiping along the inner surface of what may be an ice buildup to provide for continued heat transfer although at lesser efficiency. Should the condition continue, the whip rod is capable of migrating to the center of the countercrank where it may even be frozen solid in place. If this extreme event occurs, the countercrank may continue to rotate within the tube and about the now centrally-located whip rod without any increased force required or undesirable forces being exerted against any of the equipment including the countercrank, drive pin/drive plate arrangement, or tube. In this manner, and with this improved design, individual tubes in a multiple-tube heat exchanger bundle may be permitted to freeze solidly and yet other tubes may continue to function without damage to the drive plate, countercrank, tube combination.

While the principal advantages and features of certain specifics of the preferred embodiments have been explained above, a greater understanding of the invention may be attained by referring to the drawings and detailed description of the preferred embodiment which follow.

BRIEF DESCRIPTION OF THE DRAWINGS

FIG. 1 is a perspective view of a pair of tubes with countercranks and whip rods driven by a single drive plate;

FIG. 2 is a top view of a countercrank;

FIG. 3 is a cross-sectional view taken along the plane of line 3—3 in FIG. 2 detailing the countercrank drive pin and feed orifice;

FIG. 4 is a cross-sectional view taken along the plane of line 4—4 in FIG. 2 detailing the offset countercrank whip rod holes;

FIG. 5 is a partial cross-sectional view detailing the suspension of a rod through a whip rod hole in a countercrank;

DETAILED DESCRIPTION OF THE PREFERRED EMBODIMENT

Figure 6:
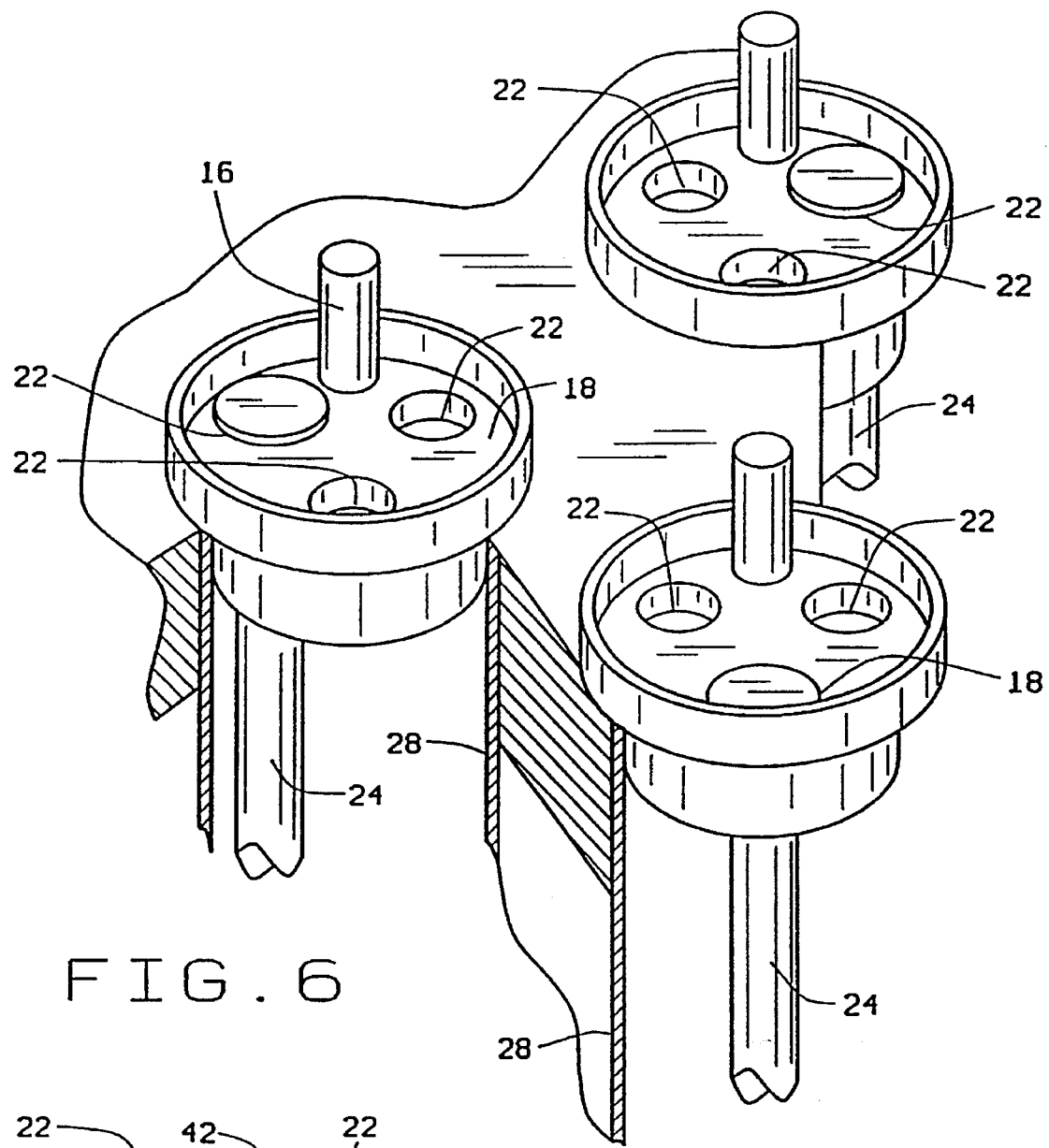
FIG. 6 is a perspective view of three countercranks of an alternative embodiment shown suspending whip rods through different whip rod holes in tubes.
Figure 9:
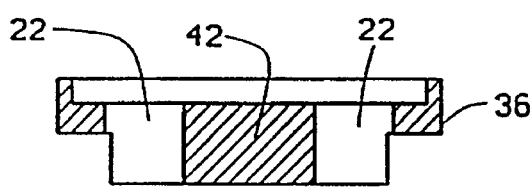
FIG. 9 is a cross-sectional view taken along the plane of line 9—9 in FIG. 7 and detailing two countercrank whip rod holes.
Figure 8:
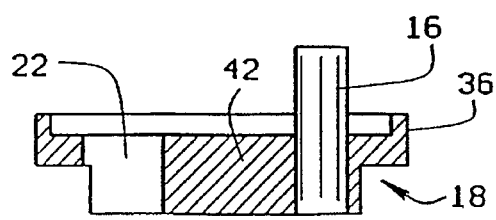
FIG. 8 is a cross-sectional view taken along the plane of line 8—8 in FIG. 7 and detailing the countercrank drive pin and whip rod hole.
Figure 7:
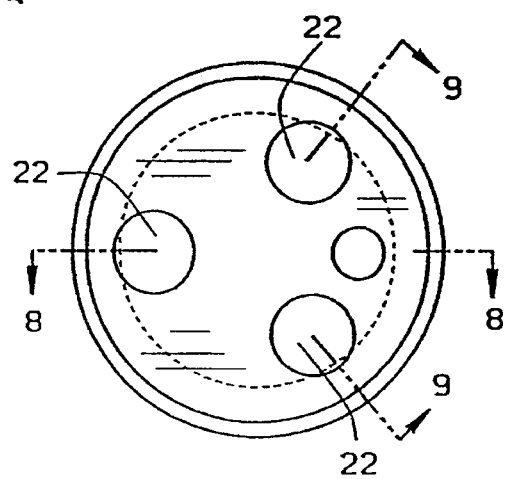
FIG. 7 is a top view of the countercrank of the alternative embodiment.

As shown in FIG. 1, an orbital rod evaporator, such as an orbital rod freezer, 10 includes a single drive plate 12 having a plurality of drive holes 14 which are matched to interfit with a plurality of drive pins 16 in a plurality of countercranks 18. Each countercrank 18 has a feed orifice 20 and one or more whip rod holes 22 through which a whip rod 24 is supported by an annular flange 26 at its upper end. Each whip rod 24 is thereby supported within a tube 28, tubes 28 being held in a fixed and spaced relationship by an upper and lower tube sheet 30, 32. The process fluid 34 (represented by arrows in FIG. 1) flows through the holes 14 in drive plate 12 and onto the top of countercrank 18 which has an upper peripheral lip 36 for "pooling" the process fluid as it flows through the orifice hole 20 and unoccupied whip rod hole 22 into the interior of tube 28. As whip rod 24 is driven orbitally around the interior of tube 28, it spreads the process fluid around the interior wall in a thin film which provides the many advantages as explained in the prior art patents mentioned above for orbital whip rod heat exchangers. Refrigerant is circulated through the interior space 38 between tube sheets 30, 32 which chills the process fluid 34 as it flows through the tubes 28 so that an ice slurry exits the bottom 40 of tubes 28. It is important to note that the tube bottoms 40 are unobstructed as the whip rods 24 are solely supported and driven at their upper ends by countercranks 18. It is also noted in FIG. 1 that whip rods 24 are shown installed in alternate ones of the whip rod holes 22, with respect to the location of drive pin 16. Thus, the mass of whip rods 24 as shown in FIG. 1 can be balanced about the center of countercranks 18, or stated differently, the mass of whip rods 24 is distributed equally about the center of the tube pattern, or stated differently, the whip rods 24 are balanced within tubes 28, or stated still differently, the dynamic forces (including the moments) generated by the whip rods 24 as they are driven orbitally within tubes 28 are balanced.

Greater detail in the construction of countercranks 18 is shown in FIGS. 2–4. As shown therein, each countercrank 18 includes a plug section 42 and a peripheral lip 36. A drive pin 16 is molded into or otherwise secured to the countercrank 18 and countercrank 18 may be made of any suitable plastic or bearing material, especially a self-lubricating bearing material. The feed orifice 20 is 180° offset from drive pin 16 and is wholly contained within plug section 42 of countercrank 18. By way of contradistinction, the two whip rod holes 22 extend through the sidewall of plug section 42 which permits whip rods 24 to ride immediately adjacent the interior wall of tube 28 as the countercranks are orbitally driven. The diameter of plug section 42 is less than the interior diameter of tube 28 to provide free rotation thereof. Whip rod holes 22 are oversized which permits the whip rods 24 to spin as they are driven. It is noted that the manufacturing tolerances for the drive plate 12, drive holes 14, countercrank 18, whip rods 24, and tube 28 are less than precision which is attributable to the overall design. As noted above, whip rods 24 are inserted in alternating whip rod holes 22 such that half of the whip rods 24 are on one side of drive pin 16 and the other half are on the other side of drive pin 16, and the pattern is repeated uniformly across the array of tubes 28 to thereby balance the dynamic forces (including the moments) generated by the rods as the countercrank is driven in an orbital manner by the single drive plate 12.

As shown in FIG. 5, the whip rods 24 are supported and driven solely from their upper ends in countercrank 18. The whip rods 24 are "hung" or suspended from countercrank 18, and within either one of whip rod holes 22 by the upper annular flange 26. Also as detailed in FIG. 5, the whip rod hole 22 in countercrank 18 overlaps the plug section 42 of countercrank 18 such that whip rod 24 freely comes in contact with the interior wall of tube 28.

The countercrank 18 depicted in FIGS. 1–5 has a pair of whip rod holes 22 to accommodate the alternate placement of whip rods 24 therein in order to align the whip rods 24 in an offset manner within tubes 28. This arrangement is convenient as it provides a single countercrank design so that the countercranks may be manufactured in quantity and used interchangeably in all of the tubes in an orbital drive heat exchanger, it merely being necessary to carefully install whip rods 24 in alternating fashion. There are many variations which would be apparent to those of ordinary skill in the art to this particular arrangement and which would also be within the scope of the invention. For example, custom manufactured countercranks for a particular heat exchanger may be made in which only a single whip rod hole is used, but that whip rod hole would be placed differently in different ones of the countercranks such that the whip rods as installed would be dynamically balanced. While this requires custom manufacturing of the countercranks, it eliminates any potential for misassembly.

Still another variation of the countercrank depicted in FIGS. 1–5 is shown in FIGS. 6–9 and includes a countercrank 18 having three whip rod holes 22 spaced at 120° intervals about the circumference of countercrank 18. In this variation, and indeed in most embodiments, it is not specifically necessary for a feed orifice to be formed in countercrank 18 as the unfilled whip rod holes 22 provide more than enough flow capacity for the process fluid. In this arrangement, whip rods 24 may be alternately installed in and supported by each of the whip rod holes 22 which also serves to balance the whip rods 24 within tubes 28. Of course, this arrangement may be extended to include four whip rod holes 22 spaced at 90° intervals, five whip rod holes 22 spaced at 72° intervals, etc., with care being taken to alternate the whip rods 24 such that an equal number of whip rods are installed in each spaced whip rod hole location and the pattern is repeated uniformly across the array of tubes 28. Also, balancing may be achieved by installing more than one whip rod in any one or more tubes 28.

Figure 10A:
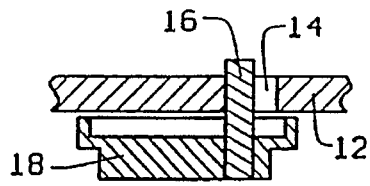
FIG. 10A is a partial cross-sectional view of an alternative drive pin arrangement between the drive plate and countercrank.

In the arrangement shown in FIGS. 1–5, the drive pins 16 are molded into or otherwise formed as part of countercrank 18 with drive holes 14 being formed in drive plate 12 to match and line up with drive pin 16. This same construction is shown in FIG. 10A as the driving connection between the single drive plate 12 and plurality of countercranks 18.

Figure 10B:
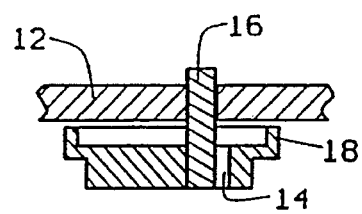
FIG. 10B is a partial cross-sectional view of a second alternative arrangement of a drive pin between the drive plate and countercrank.

Alternatively, as shown in FIG. 10B, the drive pin 16 may be conveniently molded into or otherwise secured to the single drive plate 12 and a drive hole 14 formed in countercranks 18 so as to loosely surround drive pin 16 and drive the countercranks 18 as required.

Figure 11A:
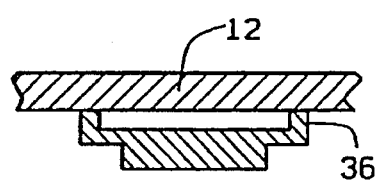
FIG. 11A is a partial cross-sectional view detailing the peripheral lip of the countercrank supporting the drive plate.
Figure 11B:
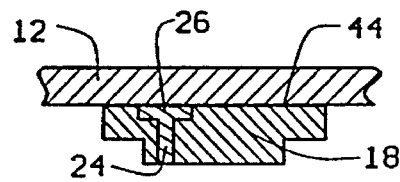
FIG. 11B is a partial cross-sectional view of an alternative countercrank construction and arrangement for supporting the drive plate.
Figure 11C:
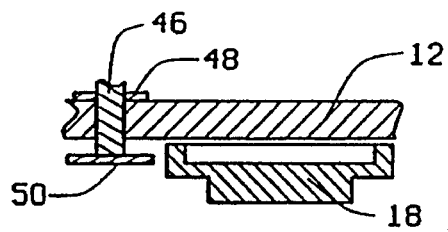
FIG. 11C is a partial cross-sectional view of another alternative arrangement for supporting the drive plate at the central drive shaft.
Figure 11D:
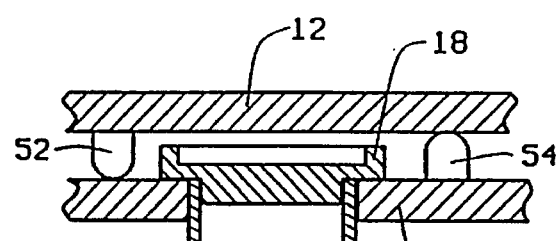
FIG. 11D is a partial cross-sectional view of still another alternative construction for supporting the drive plate from the tube sheet with stand-offs.

As depicted in FIGS. 1–5, the peripheral lip 18 conveniently acts as a support for the lower edge of the single drive plate 12. As the tubes 28 are generally uniformly spaced about the interior of the surrounding vessel of the orbital tube whip rod heat exchanger 10, the drive plate 12 is conveniently supported uniformly across its lower surface by this arrangement. This construction is also detailed in FIG. 11A. Alternatives to this construction include a countercrank 18 with a flat upper face 44 with drive rod 24 having its upper annular flange 26 countersunk into the flat upper face 44. In this arrangement, the single drive plate 12 is supported across a greater surface area of each countercrank 18. Still another support arrangement is shown in FIG. 11C wherein the single drive plate 12 may be conveniently supported at the central drive shaft 46 between a pair of annular flanges 48, 50 such that the drive plate 12 clears the upper surface of the countercranks 18. Still another arrangement for supporting the single drive plate 12 includes stand-offs 52 mounted to the lower surface of drive plate 12, or stand-offs 54 mounted to the upper surface of tube sheet 30, or some combination of both. In this arrangement, drive plate 12 is supported above the plurality of countercranks 18.

Figure 12A:
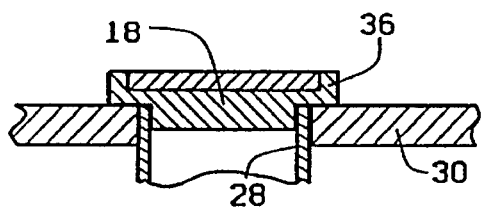
FIG. 12A is a partial cross-sectional view detailing a countercrank supported in the tube by the tube sheet face and tube end wall.
Figure 12B:
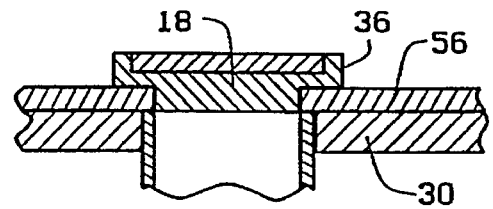
FIG. 12B is a partial cross-sectional view of an alternative arrangement for supporting a countercrank by a bearing plate.

As shown in FIGS. 12A and B, countercranks 18 may be conveniently supported in a number of different ways. For example, as shown in FIG. 12A, the peripheral lip 36 supports countercrank 18 on the upper face of upper tube sheet 30, the end wall of tube 28, or both depending upon the location of tube 28 in upper tube sheet 30. As shown in FIG. 12B, a bearing plate 56 may be placed over upper tube sheet 30 and a plurality of countercranks 18 may be supported from bearing plate 56 by their peripheral lips 36. This arrangement provides for ready replacement of bearing plate 56 in the event of wearing between countercranks 18 and bearing plate 56, all of which are accessible, including the whip rods 24, through the top of the orbital drive heat exchanger 10. An alternate arrangement utilizing individual bearing inserts for each tube is shown in FIGS. 23–25.

Figure 23:
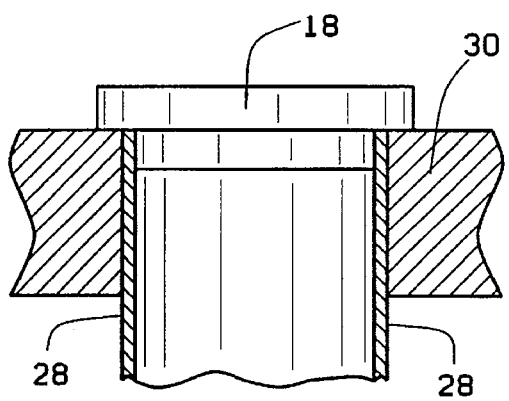
FIG. 23 is a cross-sectional view of a countercrank located within a tube.
Figure 24:
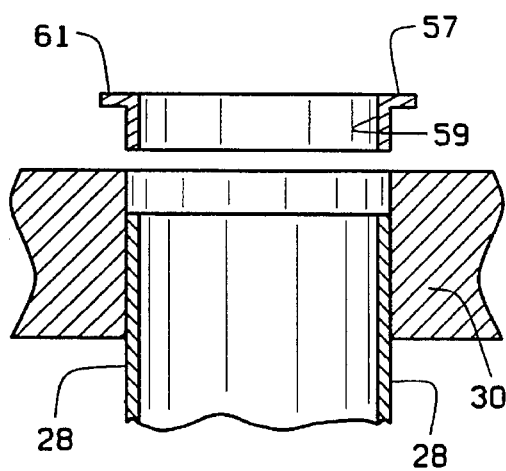
FIG. 24 is a cross-sectional view of a tube recessed within the tubesheet and a bearing insert aligned for ready insertion therein.
Figure 25:
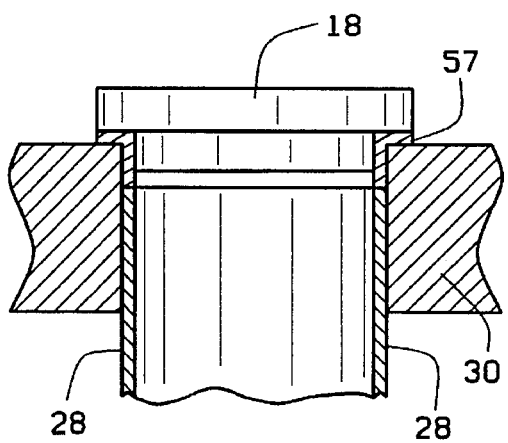
FIG. 25 is a cross-sectional view of a countercrank located within the bearing insert.

As shown in FIGS. 23–25, as an alternative to bearing plate 56 as shown in FIG. 12B, a bearing insert 57 may be provided for each tube 28 and countercrank 18. The bearing insert 57 may be conveniently sized with the same I.D. as tube 28 and fixed in the tubesheet 30 by recessing tube 28 as shown more particularly in FIG. 24. Each bearing insert 57 may include an internal side wall 59 and a peripheral lip 61 to provide a sufficient surface for contacting the entirety of countercrank 18 as it rotates within tube 28. This is best illustrated in FIG. 25. By using individual bearing inserts 57, these same advantages of bearing plate 56 are provided along with additional advantages. For example, a particular countercrank and tube which experiences uneven wear may be readily replaced individually and without the expense and waste of replacing an entire bearing plate 56. Furthermore, bearing plate 56 must be manufactured with close tolerance not only with respect to tube size but also with respect to tube location across an array. With individual bearing insert 57, close tolerance need only be maintained with respect to each tube thereby making them easier to manufacture. Also, different kinds of materials may be used to manufacture bearing insert 57 such that particularly troublesome wear at any particular location may be accommodated by utilizing materials providing greater wear characteristics. As these materials may be more expensive, they may be chosen for specific locations only and thereby result in a cost savings.

Figure 13A:
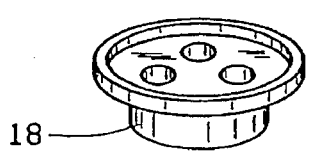
FIG. 13A is a perspective view of a countercrank of generally round construction.
Figure 13B:
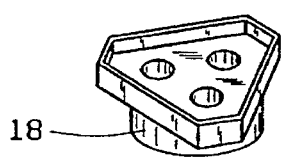
FIG. 13B is a perspective view of a countercrank of generally triangular construction.
Figure 13C:
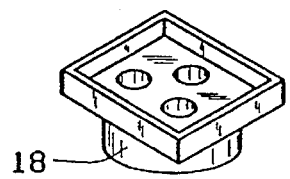
FIG. 13C is a perspective view of a countercrank of generally square construction.

Countercrank 18 may have a generally round shape as shown in FIG. 13A, or a generally triangular shape as shown in FIG. 13B, or a generally square shape as shown in FIG. 13C, or any other suitable geometric shape which accommodates the driving connection between each countercrank and the drive plate, the balancing of whip rods about the driving connection (such as drive pin 16) so that a single drive plate may be used, and sufficient holes therethrough to facilitate the feeding of the supply fluid into the interior of the tube 28.

Figure 14:
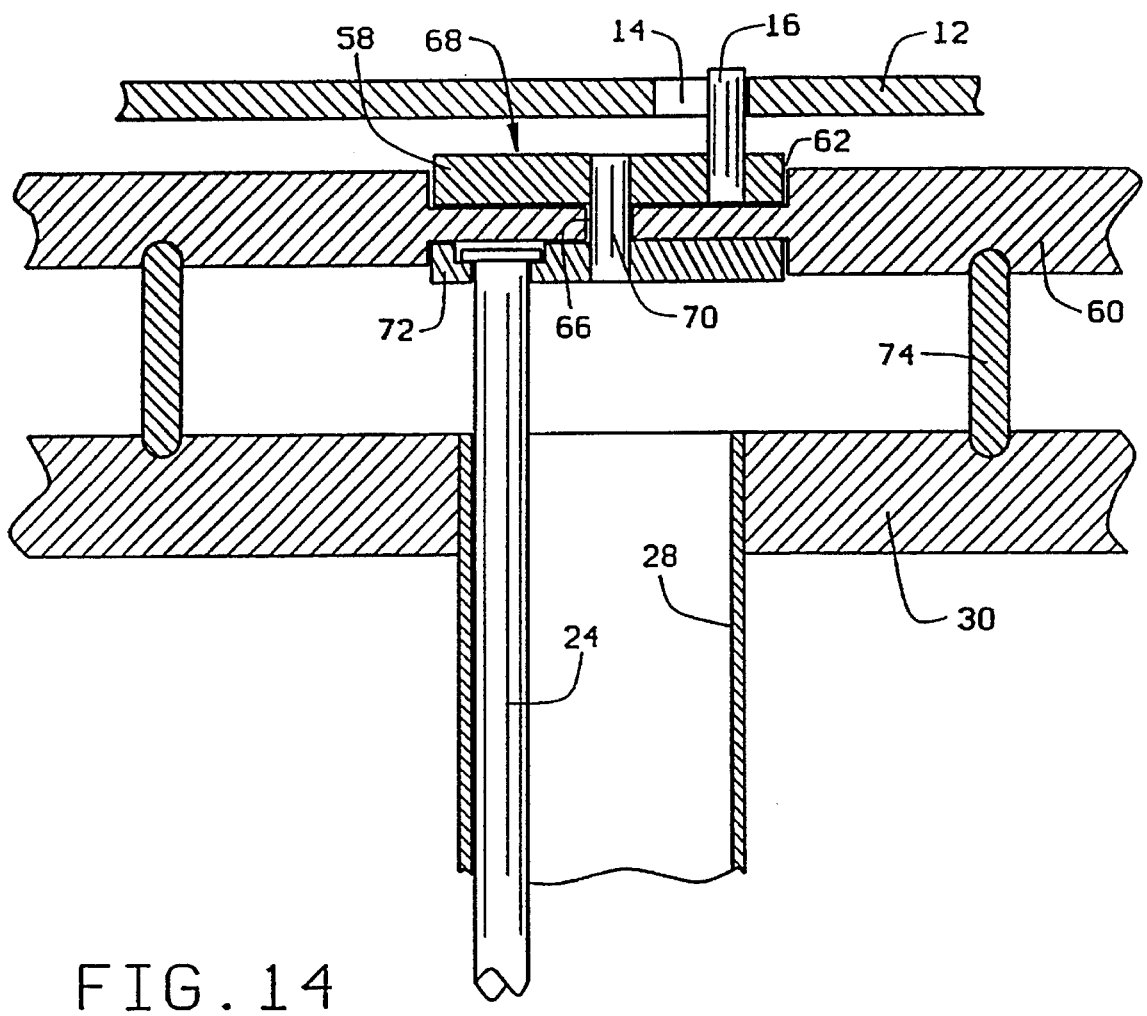
FIG. 14 is a partial cross-sectional view of an alternative drive plate and countercrank arrangement.
Figure 15:
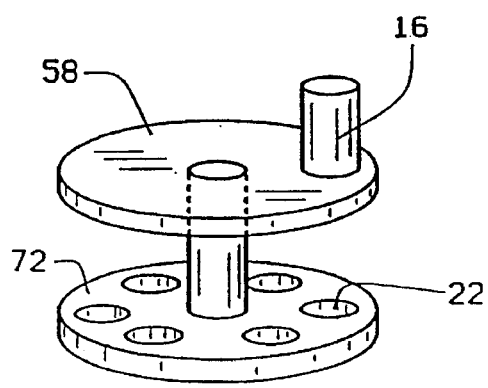
FIG. 15 is a perspective view of the crank assembly utilized in the alternative drive plate and countercrank arrangement in FIG. 14.
Figure 16:
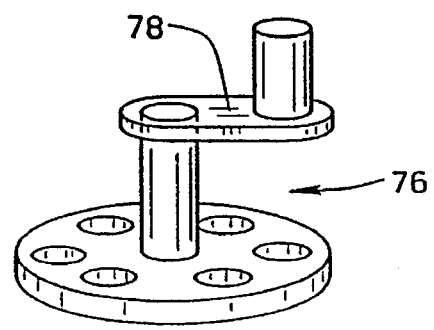
FIG. 16 is a perspective of a variation of the drive plate and countercrank arrangement shown in FIGS. 14 and 15.

Still another alternative embodiment is depicted in FIGS. 14–15 and includes the single drive plate 12 which has a plurality of drive holes 14 for interfitting with a plurality of drive pins 16 in a top crank disk 58. An intermediate plate 60 has at each tube location a top and bottom circular cut-out 62, 64 connected by a central radial opening 66 which accommodates the crank assembly 68 comprised of the top crank disk 58, a central axle 70, and a bottom crank disk 72. Whip rod 24 may be conveniently supported in any one of a plurality of whip rod holes 22 or, as explained above, otherwise spaced equally about the circumference of bottom crank disk 72 with respect to drive pin 16. Intermediate plate 60 is supported from the upper surface of tube sheet 30 by one or more spacers 74. In a variation to this arrangement, and as shown in FIG. 16, the crank assembly 68 could be replaced with a modified crank assembly 76 having an upper crank arm 78 instead of the top crank disk 58.

Figure 17:
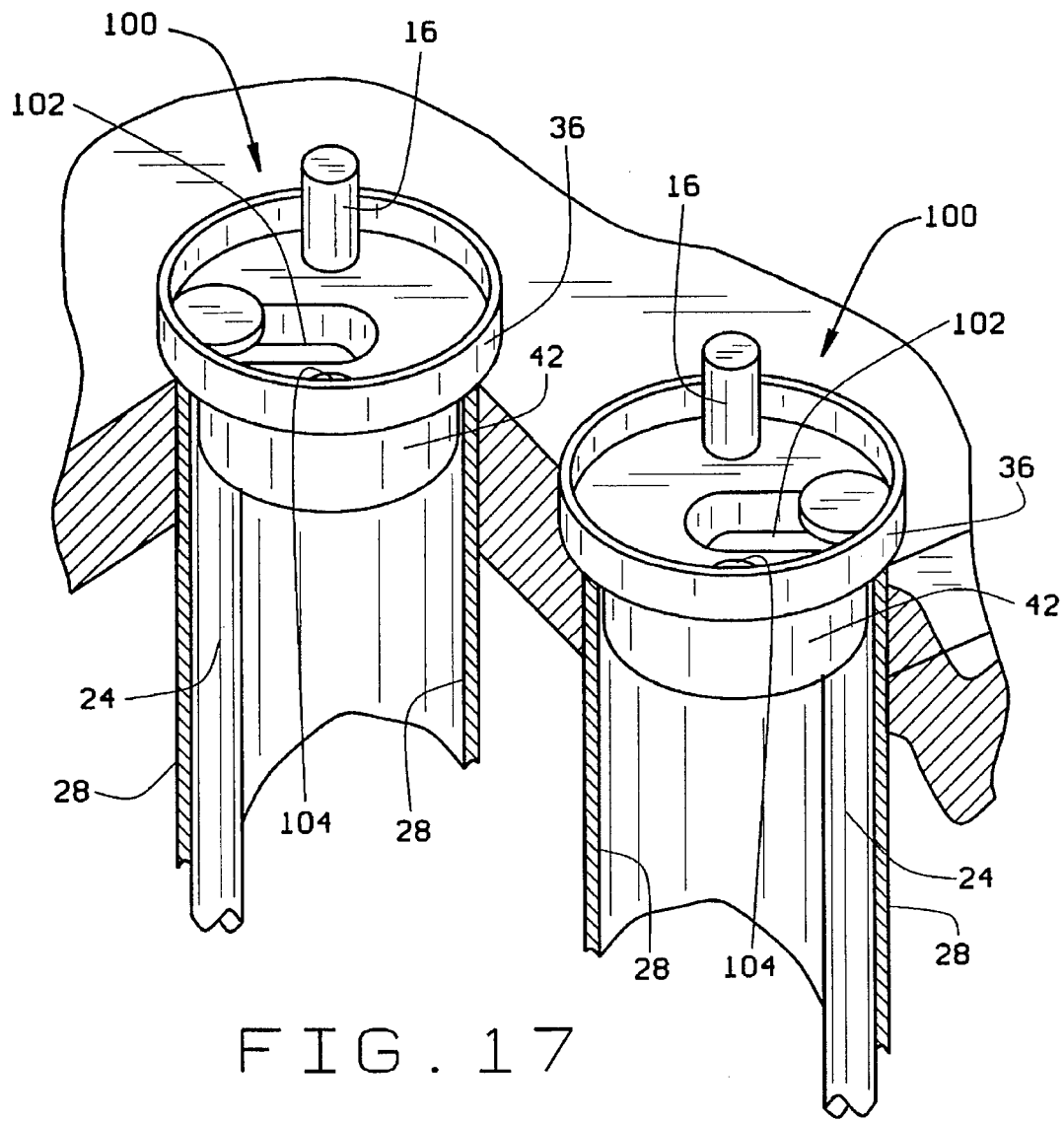
FIG. 17 is a perspective view of a pair of tubes with slotted countercranks supporting whip rods therein.
Figure 18:
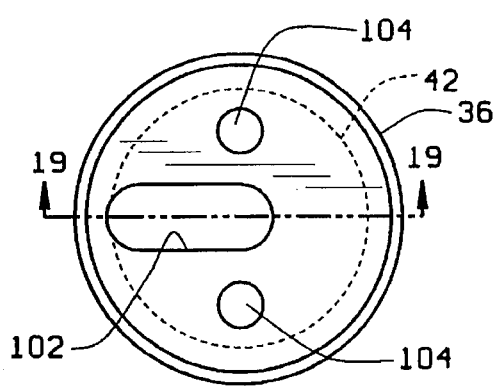
FIG. 18 is a top view of a slotted countercrank.
Figure 19:
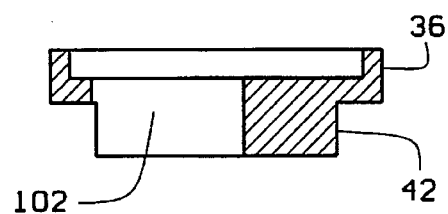
FIG. 19 is a cross-sectional view taken along the plane of line 19—19 in FIG. 18 and detailing the radial slot used to support a whip rod.

The slotted countercrank 100 of the present invention is shown in FIG. 17 and includes a drive pin 16 fixed to a plug section 42 and a peripheral lip 36, as before. However, instead of one or more whip rod holes, a single radial slot 102 supports and hangs the whip rod 24 within the tube 28. The whip rod slot 102 is shown in greater detail in FIGS. 18 and 19 and extends from the center of plug section 42 radially outwardly and into the periphery of plug section 42. As best shown in FIG. 18, a pair of drive pin holes 104 are provided on opposite sides of countercrank 100 so that a drive pin 16 may be inserted on either side of whip rod slot 102 as desired to balance the whip rods 24 throughout the entirety of the tubes 28 and also to provide a feed for the process fluid to flow into the tube, as is explained in greater detail above.

Figure 20:
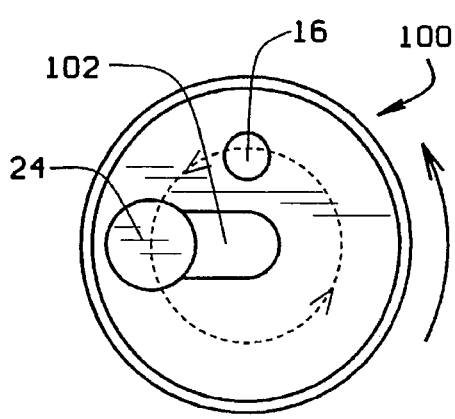
FIG. 20 is a top view of a slotted countercrank during normal operation.
Figure 21:
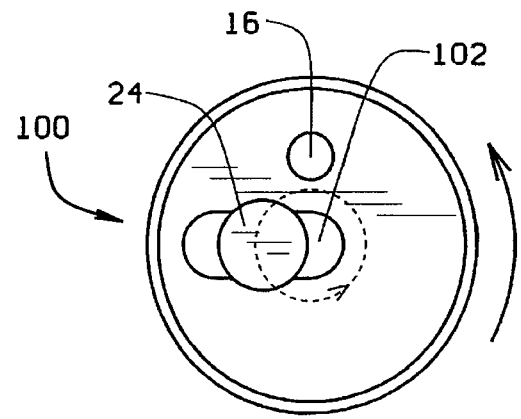
FIG. 21 is a top view of a slotted countercrank with its whip rod partially migrated within the radial slot.
Figure 22:
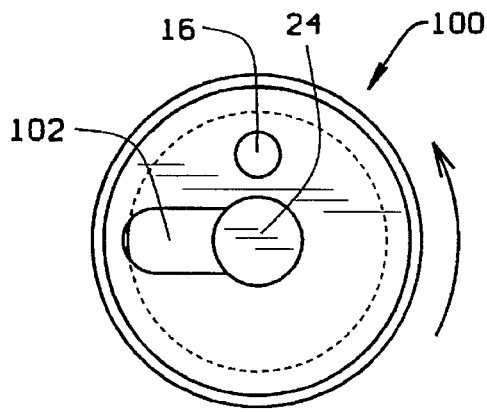
FIG. 22 is a top view of a slotted countercrank with its whip rod totally migrated within the radial slot to the center of the countercrank.

Operation of the slotted countercrank 100 of the present invention is best understood by referring to FIGS. 20–22. As shown in FIG. 20, under normal conditions the slotted countercrank 100 rotates as it is driven by a drive plate (not shown) engaging drive pin 16. Through centrifugal forces, whip rod 24 will migrate outwardly to engage the interior wall of a tube (not shown) to wipe its inner surface and achieve the desired heat transfer effect of the heat exchanger. Slot 102 is preferably sized to permit free rotation of whip rod 24 as slotted countercrank 100 rotates. This "loose" fit also permits free migration of whip rod 24 in a radial direction within whip rod slot 102. As and if ice forms along the inner sidewall of its associated tube, as shown in FIG. 21, whip rod 24 is free to migrate radially inward along whip rod slot 102 and yet permit continued free rotation of slotted countercrank 100. To a lesser effect, heat transfer may still take place within a tube which has some ice buildup so that it may remain partially functional. Indeed, whip rod 24 may even self-adjust its radial position within whip rod slot 102 as slotted countercrank 100 rotates to different angular positions within its associated tube. This accommodates an uneven layering of ice, or other obstructions or the like which might otherwise jam or break other countercrank arrangements. The ultimate endpoint for accumulation of ice along the inner sidewall of the tube is shown in FIG. 22 as whip rod 24 has migrated along whip rod slot 102 to the center of slotted countercrank 100. In this configuration, it is even possible that whip rod 24 be frozen fixedly in position within the center of its associated tube. Nevertheless, slotted countercrank 100 may freely revolve around whip rod 24 and within its associated tube without any mechanical binding or undesired forces being created which could otherwise damage the slotted countercrank 100, drive pin 16, or its associated drive plate (not shown).

As can be understood from the foregoing explanation, slotted countercrank 100 permits a driving connection between a drive source and a plurality of whip rods 24 which accommodates any one or more of whip rods 24 becoming frozen in place within its associated tube without causing mechanical breakage, binding, or other disruption of the driving connection and without interfering with operation of the other unfrozen tubes being driven by the same driving connection. Upon normal maintenance inspection, or should conditions result in further tubes freezing so as to set off system monitoring devices due to low overall performance, frozen or otherwise obstructed tubes may then be cleared and the heat exchanger brought back to full operating condition with all tubes processing fluid and exchanging heat as desired.

Although the foregoing invention has been explained in the context of a heat exchanger being used as a freezer, it should be understood that the slotted countercrank of the present invention may well be utilized in other applications and helps to avoid any mechanical binding or breakage in the event of other obstructions entering the system. Furthermore, by using a whip rod slot instead of whip rod hole, further relaxation in the manufacturing tolerances of the countercrank and tube combination may be expected.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In an orbital tube, whip rod heat exchanger, and said heat exchanger having a plurality of tubes with each of said tubes having at least one whip rod located therein, the improvement comprising a single drive plate for forcing relative orbital motion of said whip rods inside their respective tubes, each whip rod having a support for locating and maintaining said whip rods in an offset pattern in said tubes during said motion so as to minimize any vibration induced thereby in said heat exchanger, and each of said supports having a slot to permit migration of its associated whip rod to a substantially central location to thereby permit the free rotation of said support as said whip rod migrates to and arrives at a substantially fixed position with respect to its associated tube.

2. The heat exchanger of claim 1 wherein said supports locate and maintain said rods spaced within said tubes so that the total mass of said rods is substantially equally distributed about the center of the pattern of said tubes.

3. The heat exchanger of claim 2 wherein each of said tubes has a single rod located therein and wherein said supports locate and maintain said rods at equally spaced locations about the circumference of said tubes.

4. The heat exchanger of claim 3 wherein said supports locate and maintain approximately half of said rods at positions 180° about the circumference of said tubes from the position of said other half of said rods.

5. The heat exchanger of claim 4 wherein approximately half of said rods are located at the same position about the circumference of said tubes and the other half of said rods are located at a position 180° from said first position.

6. The heat exchanger of claim 2 wherein said supports comprise a countercrank adapted to fit with each of said tubes, said countercrank slots each having at least one of said rods located therein.

7. The heat exchanger of claim 6 further comprising a driving connection between each of said countercranks and said drive plate.

8. The heat exchanger of claim 7 wherein said driving connection includes a drive pin and a matching drive hole extending between each of said countercranks and said drive plate so that as said drive plate is driven in an orbital manner said drive plate drives said plurality of countercranks and, in turn, said rods orbitally about their respective tubes.

9. The heat exchanger of claim 8 wherein each of said countercranks supports said drive plate.

10. The heat exchanger of claim 9 wherein said drive plate support comprises a peripheral lip.

11. The heat exchanger of claim 10 further comprising at least one tube sheet for mounting said tubes in a fixed orientation, said countercranks being supported by said tube sheet.

12. The heat exchanger of claim 11 further comprising a bearing plate between said tube sheet and said countercranks.

13. The heat exchanger of claim 11 wherein one or both of said drive plate or tube sheet has a plurality of standoffs for supporting said countercranks from said tube sheet.

14. The heat exchanger of claim 9 wherein each countercrank has a plurality of drive pin holes, said drive pin holes being substantially equally spaced about the circumference of said countercranks, and wherein a drive pin is secured in one of said holes in each countercrank to thereby balance said rods.

15. The heat exchanger of claim 14 wherein each countercrank has a pair of drive pin holes, said drive pin holes being offset 180° from each other.

16. The heat exchanger of claim 14 further comprising a rod support for supporting said rods solely at their upper ends within said slots.

17. The heat exchanger of claim 16 wherein said rod support comprises an annular bearing formed at the upper end of said rods.

18. The heat exchanger of claim 17 wherein said annular bearing comprises a cap formed at the top of each rod, said cap having a diameter greater than the diameter of said countercrank slot which receives said rod.

19. The heat exchanger of claim 18 wherein said drive plate and countercranks comprise the sole driving connection to said rods, said countercranks each having a hole therein to permit the introduction of a material desired to be processed, the bottoms of said tubes and rods being thereby unobstructed to permit the free flow of said material out of said tubes.

20. In an orbital tube, whip rod heat exchanger, said heat exchanger having a plurality of tubes with each of said tubes having a single whip rod located therein, and a drive plate for forcing relative orbital motion of said whip rods inside their respective tubes, the improvement comprising a plurality of rod supports for supporting said rods and driving said rods with said drive plate solely at their upper ends, said rod supports permitting relative radial movement between each of said rods and its associated rod support, and said rod supports being located for dynamically balancing the forces generated by said rods within said tubes to thereby minimize any vibration induced thereby in said heat exchanger.

21. The heat exchanger of claim 20 wherein said rod supports position said rods within said tubes so that the total mass of said rods is substantially equally distributed about the center of the pattern of said tubes.

22. The heat exchanger of claim 21 wherein each of said rod supports comprises a countercrank adapted to fit with each of said tubes, said countercranks each having at least one slot through which its associated rod is located and supported.

23. The heat exchanger of claim 22 wherein some of said countercrank slots are offset from others of said countercrank slots to thereby offset said rods within said tubes.

24. The heat exchanger of claim 23 further comprising a driving connection between each of said countercranks and said rods.

25. The heat exchanger of claim 24 wherein said driving connection includes a drive pin and a matching drive hole extending between each of said countercranks and said drive plate so that as said drive plate is driven in an orbital manner said drive plate drives said plurality of countercranks and, in turn, said rods orbitally about their respective tubes.

26. In an orbital tube, whip rod heat exchanger, said heat exchanger having a plurality of tubes with each of said tubes having at least one whip rod located therein, the improvement comprising a countercrank fitted to each of said tubes, each countercrank having at least one slot therein for receiving and supporting a whip rod within its associated tube, said slot permitting relative radial movement between said whip rod and said countercrank.

27. The heat exchanger of claim 26 further comprising a drive plate and a driving connection between each of said countercranks and said drive plate.

28. The heat exchanger of claim 27 wherein said countercranks provide the sole driving connection and support for said rods, said countercranks being located at the tops of said tubes so that the bottoms of said tubes remain substantially unobstructed and material flowing through said tubes may flow freely out the bottoms thereof.

29. The heat exchanger of claim 28 wherein said countercranks dynamically balance the forces generated by said rods within said tubes to thereby minimize any vibration induced thereby in said heat exchanger.

30. The heat exchanger of claim 29 wherein said countercranks locate said rods in an offset pattern in their associated tubes.

31. The heat exchanger of claim 30 wherein each of said countercranks includes a feed hole through which a material is fed into its associated tube for processing therein.

32. The heat exchanger of claim 31 wherein each of said countercranks includes a pair of drive pin holes offset 180° from each, only one drive pin being inserted in alternate ones of said pair to thereby balance said rods in said tubes with respect to their driving connections.

33. In an orbital tube, whip rod heat exchanger, said heat exchanger having a plurality of tubes with each of said tubes having at least one whip rod located therein, the improvement comprising a driving connection between a drive source and said whip rods, said driving connection having slots to permit individual ones of said whip rods to migrate within said slots.

34. The heat exchanger of claim 33 wherein said driving connection includes a plurality of countercranks, said countercranks being in driving relationship between said drive source and said whip rods, said countercranks including said slots.

35. The heat exchanger of claim 34 wherein each countercrank includes no more than one of said slots, and each of said slots is substantially radially oriented.

36. The heat exchanger of claim 35 wherein each of said slots extends from substantially a center of its associated countercrank to substantially a periphery thereof.

* * * * *